April 22, 1952   R. LOZANO Y GARCIA DE VINUESA   2,593,903
HYDRAULIC ELEVATOR OR JACK
Filed Jan. 17, 1948                                    2 SHEETS—SHEET 1
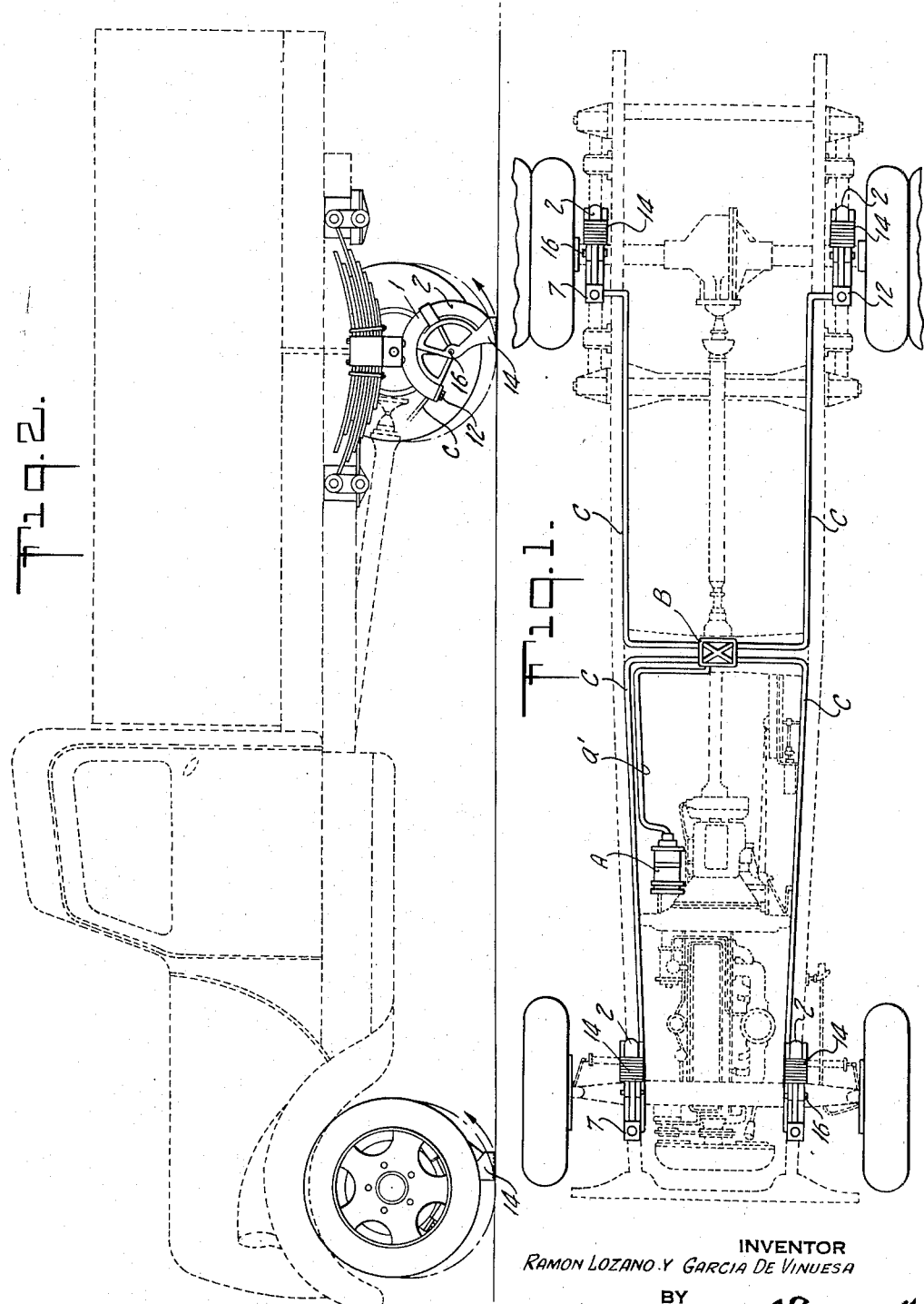
INVENTOR
RAMON LOZANO Y GARCIA DE VINUESA
BY
ATTORNEYS

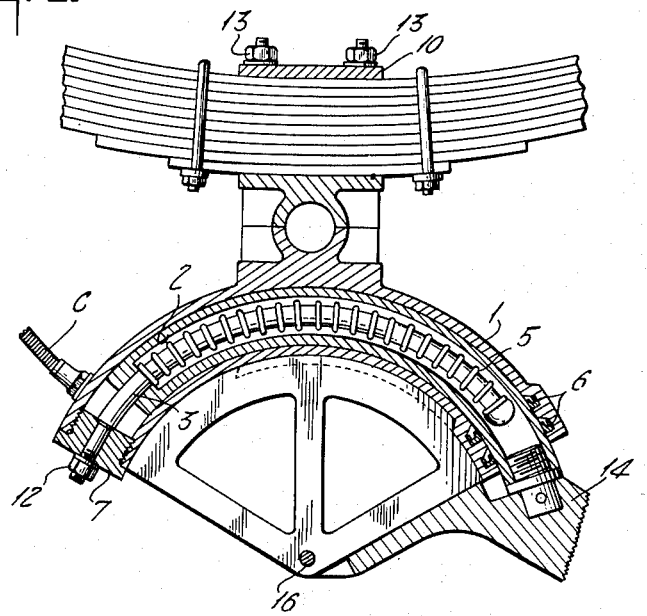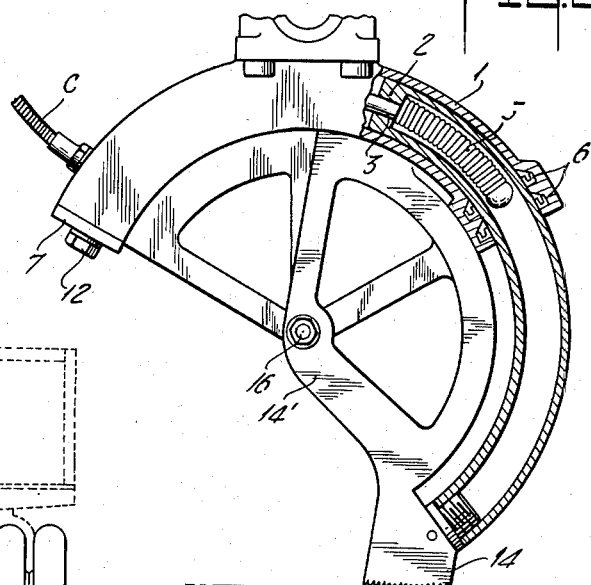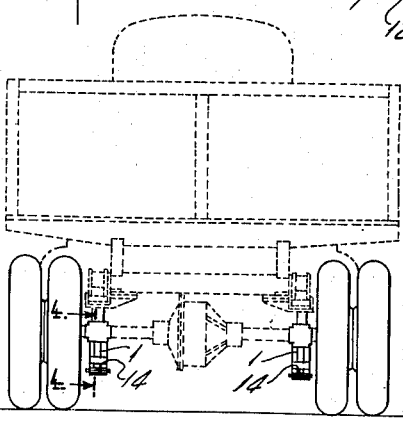

Patented Apr. 22, 1952

2,593,903

UNITED STATES PATENT OFFICE 2,593,903

HYDRAULIC ELEVATOR OR JACK

Ramon Lozano y Garcia de Vinuesa,
Cordoba, Spain

Application January 17, 1948, Serial No. 2,854
In Spain May 21, 1947

3 Claims. (Cl. 254—86)

The present invention relates to lifting jacks for automotive vehicles, and has special reference to hydraulically operated devices of this character.

The principal object of the invention is to provide a device of this character which is of simple and strong construction, and capable of being conveniently operated and controlled by a switch or other means conveniently located on the instrument board of the vehicle.

The several features of the invention, whereby this and other objects may be attained, will be readily understood from the following description and accompanying drawings, in which:

Figure 1 is an inverted plan view, partly diagrammatical, of the chassis of an automobile or truck embodying my improved device in its preferred form, the chassis being shown by dotted lines;

Fig. 2 is a side view of the truck or automobile shown raised by the lifting jack, the unraised position of the wheels of the vehicle being shown by dot and dash lines, certain parts being broken away, and the body of the vehicle being shown by dotted lines;

Fig. 3 is a rear view of the same;

Fig. 4 is a sectional view, partly in elevation and on an enlarged scale, taken substantially on the line 4—4 of Fig. 3; and Fig. 5 is a similar view, but with certain parts shown in a different position.

Figure 1 shows the manner of installing my improved lifting jack in the chassis of an automobile or truck. As shown a hydraulic pump A is located adjacent to the gear-case of the automobile engine. From this pump a tube or pipe $a'$ leads to a valve and distributor casing B for conveying oil or other suitable fluid to the casing, the fluid being supplied to the pump from a suitable reservoir (not shown). From this casing the fluid is simultaneously distributed through tubes or pipes C to the lifting devices which are respectively associated with the four wheels of the vehicle. Each of these lifting devices comprises an arcuate cylinder 1 having its inner end portion connected with one of the pipes C, and a piston 2 mounted in the cylinder. The outer end of this piston is connected with the outer end of a shoe 14 mounted to turn about the axes of the cylinder and piston, whereby upon pressure of the fluid being applied into the inner end of the cylinder, the piston is moved outwardly to swing the shoe 14 downwardly which upon contacting with the ground serves to lift the vehicle, the four lifting devices lifting the vehicle at all four points from the ground.

The piston 2 is held within the cylinder by the end of a retaining-rod 3 which is secured to a plug 7 closing the inner end of the cylinder, a washer and nut 12 being screw-threaded on the inner end of the rod. The piston is returned to its retracted position, so as to retract the shoe 14, by means of a spring 5 coiled about the rod 3 and interposed between a flange or head on the outer end of the rod and a shoulder on the inner end of the piston.

A tight joint is maintained between the outer end of the cylinder and the piston by means of inwardly directed U-shaped annular packing rings 6 of leather or other suitable material.

The cylinder 1 of each device is fastened about the associated axle and spring of the vehicle by means of a pillow block, the fastening of which is effected by means of screws or bolts and a plate 10, the bolts being provided with nuts 13 engaging the top of the plate.

The shoe 14 has a bifurcated segmental web 14' which extends over the sides of a segmental web on the underside of the cylinder 1, and is mounted to turn on a bolt 16 extending through apertures in said webs, the axis of the bolt being in the same vertical plane with the axis of the axle of the wheel.

The upper arcuate surfaces of the bifurcated web 14' are in sliding engagement with corresponding surfaces on the underside of the cylinder. The outward movement of the piston 2 to project the shoe 14 is limited by the engagement of shoulders on the arcuate surfaces of the web 14' and shoulders on the underside of the cylinder.

It will be apparent that this construction and arrangement of the shoe, piston and cylinder provides a strong and durable structure, and when the shoe is projected it is firmly held in position and supported by the underside of the cylinder, the pivot bolt 16 and the engagement of said stop shoulders on the shoe web and on the underside of the cylinder. Also the bifurcated web of the shoe by engagement with the sides of the web on the cylinder firmly supports the shoe laterally. Upon release of the fluid pressures in the several cylinders, the coiled springs 5 immediately act to retract the shoes and thus lower the vehicle. When the shoes are in retracted position adequate clearance is provided between the several devices and the ground, and the shoes are hidden from view by the wheels.

The hydraulic pump A for operating the several devices may be driven from the shaft of the vehicle engine through a clutch that may be conveniently controlled from the instrument board of the vehicle through any suitable means (not shown). It will be apparent that upon operating the pump the several pistons 2 may be simultaneously forced outwardly so as to cause the shoes 14 to be swung downwardly into contact with the ground and, upon continued movement of the shoes, the vehicle to be lifted so as to raise all four wheels from the ground, the vehicle moving rearwardly slightly as it is raised. Upon release of the hydraulic pressure, the springs 5 simultaneously retract the pistons so as to retract the shoes 14, thus lowering the vehicle.

What I claim is:

1. In a lifting jack for a vehicle having front and rear axles and wheels mounted on the axles, the combination of a shoe adapted to be pivotally mounted adjacent the inner side of one of the wheels of the vehicle with its axis spaced below the axles of the vehicle, an arcuate cylinder concentric with the axis of said shoe and arranged between the associated axle of the vehicle and the axis of the shoe, and a piston in the cylinder having one end secured to the outer end portion of said shoe, whereby upon movement of the piston in one direction the shoe is swung downwardly with relation to the cylinder first to engage the ground and then to lift the vehicle, remotely controllable fluid pressure means connected with the cylinder for thus operating the piston, and means for securing the cylinder to the vehicle so as to be held in fixed position with relation to the vehicle.

2. In a lifting jack for a vehicle, the combination of an arcuate cylinder adapted to be secured to the underside of the vehicle, a piston mounted in the cylinder, the piston and the cylinder having corresponding inner and outer ends, a shoe having one end pivotally mounted to turn about the axis of the cylinder, and its other end secured to the outer end of the piston whereby upon movement of the piston in one direction the shoe is swung downwardly first to engage the ground and then to lift the vehicle, fluid pressure means connected with the inner end of the cylinder for thus moving the piston, and a spring for moving the piston in the opposite direction and retracting the shoe upon release of said fluid pressure means.

3. In a lifting jack for a vehicle having front and rear axles and wheels mounted on the axles, the combination of an arcuate cylinder adapted to be secured to the under side of the vehicle below one of the axles thereof and adjacent the inner side of one of the wheels on the axle, said cylinder having a depending web, a shoe having a bifurcated web arranged at opposite sides of the cylinder web and pivotally connected thereto to swing about the axis of the cylinder, the upper surfaces of said shoe web being concentric to said axis and the underside of the cylinder having corresponding curved surfaces in sliding engagement therewith, a piston in the cylinder having its outer end connected to the outer end of said shoe whereby upon movement of the piston in one direction the shoe is swung downwardly first to engage the ground and then to lift the vehicle, fluid pressure means for thus moving the piston, a rod extending a distance concentrically through the piston and having one end secured to the inner end of the cylinder, and a spring coiled about the rod and interposed between a shoulder on the outer end of the rod and a shoulder on the piston for moving the piston in the opposite direction to retract the shoe when the fluid pressure means is released, said bifurcated web of the shoe and the underside of the piston having co-engaging shoulders for limiting the downward movement of the shoe.

RAMON LOZANO Y GARCIA DE VINUESA.

REFERENCES CITED

The following references are of record in the file of this patent:

UNITED STATES PATENTS

| Number | Name | Date |
| --- | --- | --- |
| 898,274 | Singleton et al. | Sept. 8, 1908 |
| 1,268,101 | Drew | June 4, 1918 |
| 2,031,393 | Tirabasso | Feb. 18, 1936 |
| 2,048,264 | Harris | July 21, 1936 |
| 2,251,308 | Washington | Aug. 5, 1941 |

FOREIGN PATENTS

| Number | Country | Date |
| --- | --- | --- |
| 476,772 | Germany | May 24, 1929 |
| 478,912 | Germany | July 3, 1929 |